Oct. 25, 1932.   J. BECHTOLD   1,885,072
EGG COUNTER FOR HENS
Filed Dec. 27, 1930
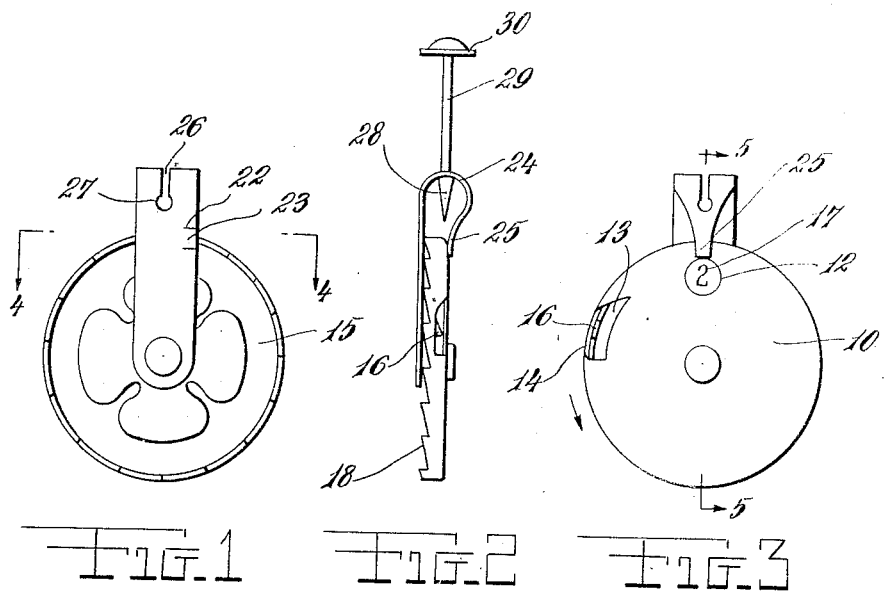
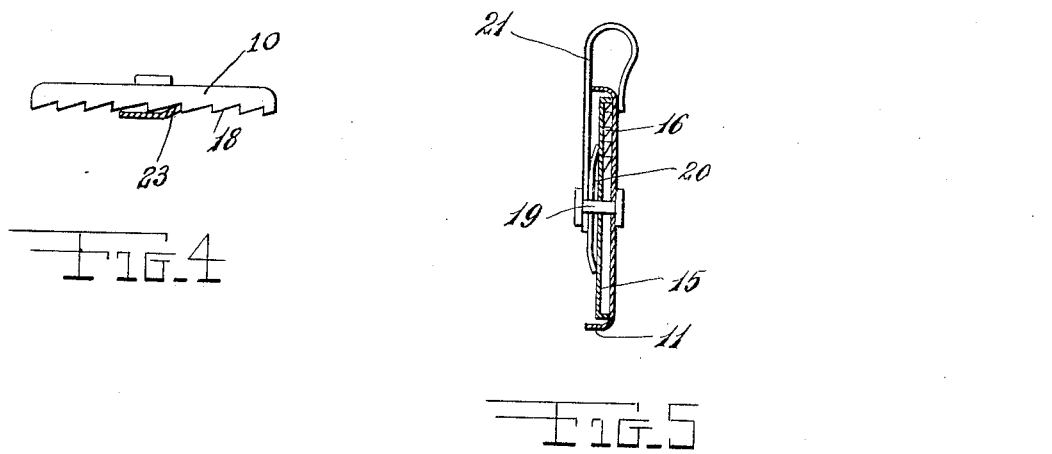
INVENTOR
*J. Bechtold*
BY his ATTORNEY *J. Lederman*

Patented Oct. 25, 1932

1,885,072

UNITED STATES PATENT OFFICE

JOSEF BECHTOLD, OF COLEMAN STATION, NEW YORK

EGG COUNTER FOR HENS

Application filed December 27, 1930. Serial No. 505,036.

The main object of this invention is to provide a device which may be conveniently attached to individual hens or other poultry for the purpose of establishing a record of the total number of eggs laid by the hen.

Another object of the invention is to provide an egg counter which is securely attached to the web of the wing of a fowl and is adapted to be manually operated to indicate the total number of eggs laid in a season by the particular fowl upon which the device is mounted.

The above and other objects will become apparent in the description below in which characters of reference refer to like-named parts in the drawing.

Referring briefly to the drawing Figure 1 is a rear elevational view of the egg counter.

Figure 2 is a side elevational view of the same.

Figure 3 is a front elevational view of the egg counter.

Figure 4 is a cross-sectional view taken on line 4—4 of Figure 1.

Figure 5 is a longitudinal cross-sectional view taken on line 5—5 of Figure 3.

Referring in detail to the drawing the numeral 10 indicates the external face of a drum which is provided with an encircling rim 11. The face of this disk is pierced by a sight hole 12 at a position near its bounding edge. At one position upon the face an arcuate channel 13 is formed. This channel exposes a section 14 of the rim 11 and is formed taperingly at one end and curvedly at the opposite end to permit a member to roll from the surface of the face 10 to the bottom of the channel 13 for purposes which will be more fully hereinafter described. The channel 13 exposes a small area or radial sector of a disk 15 which is provided with ratchet teeth 16 around its entire periphery. The obverse face of the disk 15 encased in the drum of the egg counter is provided with a series of progressive numerals preferably from 1 to 14. One of these teeth 16 on the disk is at all times visible and in condition for movement in the channel 13 formed in the face 10 of the drum progressive numerals 17. These numerals 17 are exposed one at a time through the sight hole 12 in the face 10 of the drum. The rim 11 of the drum is similarly provided with ratchet teeth 18.

The drum and disk are held in axially cooperating position one within the other upon a stud 19 which is provided with a head at each end. A resilient spring washer 20 is mounted upon the stud 19 and is adapted to urge the teeth of the disk to ride upon the reverse surface of the face 10 of the drum, it being noted that the teeth 16 of the disk are turned at right angles to the disk itself.

An actuator trigger is rotatably mounted upon the stud 19. This actuator trigger comprises a leg 21 which is slitted on its marginal edge at two parallel positions and the material between these slits 22 is bent in an inclining direction to form a flexible ear 23 engageable successively with the series of ratchet teeth 18 formed in the rim 11 of the drum. The leg 21 is formed into a return bend or inverted saddle 24 which extends in a curved position as a flexible tongue 25, the latter riding normally upon the surface of the face 10 of the drum as illustrated in Figures 2 and 5. The return bend or saddle 24 is provided with a longitudinal slot 26 at one extremity of which an enlarged opening 27 is formed. The slenderly tapering, pointed head 28 of a piercing pin 29 is adapted to be inserted into the opening 27 after the piercing pin has passed through the web of the wing of a fowl. The piercing pin is surmounted by a shoulder flange 30 which abuts and lies adjacent to an enlarged head of the piercing pin.

The device is adapted to indicate the number of eggs which a fowl has laid at any given time during the year. The device is manually operated by the poultry husbandman at the time that it is indicated that the fowl has laid an egg. The trigger at each laying is moved one tooth upon the rim of the drum member. Moving this trigger to the next tooth is accomplished by the rotation of the drum a prescribed distance in the direction indicated by the arrow in Figure 3. This rim may be conveniently provided with 20 teeth so that with each revolution of the drum 20 eggs have been counted. As the drum completes a revolution at the position where the channel 13 is located the tongue 25 drops into the channel upon the curved surface thereof and comes to abutting position adjacent one of the teeth 16 of the disk 15 which finds itself within the area of the channel. Moving the tongue 25 successively to the next tooth will cause said tongue to rotate the disk 15 during the time said tongue finds itself in the channel 13 and at the end of the latter the tongue will rise out of said channel and will become disengaged from the particular tooth 16 of the disk. With this movement the disk has been rotated a predetermined degree of arc and will have shifted the disk a sufficient distance to permit the exposure of the next successive number upon the disk which is exposed through the sight hole 12. Each number on the disk indicates 20 eggs while each tooth upon the rim 11 of the drum indicates a single egg. To provide means for suspending these counters from the fowl a piercing pin 29 with a tapering pointed end 28 is provided. The end 28 pierces the web at the crotch of the wing or at other desirable places upon the fowl and the head 29 is then slid through the openings 27 at the extremities of the slots and the device is rotated so as to hang in suspended position.

It is to be noted that certain changes in form and construction may be made without departing from the spirit and scope of the invention.

I claim:

A device of the class described comprising a hollow cylindrical drum open at the rear and having a face member closing the same at the front, said face having a sight hole therein, a pin passing through the axis of said drum and having said drum rotatably mounted thereon, a disk rigid with said pin rotatable in said drum and having numerals thereon successively visible through said sight hole, a trigger rotatably mounted on said pin at the rear of said drum and extending radially beyond the periphery of said drum, said trigger being looped around the cylindrical edge of said drum from the rear to the face of said drum, the free end of said drum lying adjacent said face of the drum, a flexible tongue on said free end of the trigger normally lying adjacent said face, peripheral teeth on said disk at right angles to said disk, an arcuate channel in said face exposing one of said disk teeth therethrough, peripheral teeth on the rear edge of said drum, a flexible ear on the rear portion of said trigger engaging said drum teeth, said flexible tongue being adapted to enter said channel to engage said exposed tooth when passing said channel during rotation of said trigger with respect to said face, and a spring between the rear portion of said trigger and said disk normally urging said disk toward the rear of said face and also normally urging said flexible tongue against the front of said face.

In testimony whereof I affix my signature.

JOSEF BECHTOLD.